United States Patent [19]
Iwatsu

[11] 3,726,166
[45] Apr. 10, 1973

[54] SAFETY DEVICE OF A SHEARING MACHINE

[76] Inventor: Bunji Iwatsu, Furukawa-shoten-nai, 62 Tomijim-cho, Nishi-ku, Osaka, Japan

[22] Filed: Apr. 23, 1971

[21] Appl. No.: 136,863

[30] Foreign Application Priority Data

Feb. 16, 1971 Japan..............................46/008901

[52] U.S. Cl. ..........................83/58, 74/615, 83/397, 83/522, 83/546, 83/DIG. 1
[51] Int. Cl...............................B26d 5/00, B26d 7/24
[58] Field of Search........................83/397, 522, 544, 83/545, 546, 58, 68, DIG. 1; 100/53; 74/612, 613, 615

[56] References Cited

UNITED STATES PATENTS 2,364,193  12/1944  Columbe................................74/612

FOREIGN PATENTS OR APPLICATIONS

| | | | |
|---|---|---|---|
| 750,960 | 2/1945 | Germany | 83/546 |
| 1,053,557 | 1/1967 | Great Britain | 83/58 |
| 477,564 | 8/1927 | Germany | 83/544 |
| 199,085 | 10/1965 | Sweden | 83/545 |

*Primary Examiner*—Andrew R. Juhasz
*Assistant Examiner*—James F. Coan
*Attorney*—Dawson, Tilton, Fallon & Lungmus

[57] ABSTRACT

A safety device of a shearing machine comprising a pair of upper and lower edged blades for cutting off a sheet metal to the required width thereof, a driving means adapted to vertically move said upper blade, a front plate mounted on the front of said upper blade and provided with gates for the observation of said blades, a bracket fixed to said front plate, and safety guards of said safety device each mounted on said bracket and arranged to cover the gate thereby ensuring the better safety during the operation to the operator.

3 Claims, 4 Drawing Figures

SAFETY DEVICE OF A SHEARING MACHINE

The present invention relates to a safety device for a shearing machine, particularly to a safety guard and a flasher lamp associated with said guard, both of these being mounted on the shearing machine which is usable for cutting off sheet metal (e.g., about 2m.m. to 10m.m. thick) to the required width or length thereof.

The conventional typed shearing machine which has been heretofore used comprises a table adapted to position a sheet thereon, a bed adapted to support said table thereon, a pair of lower and upper blades arranged for cutting off the sheet on the table to the required width, a lower blade being fixed to the bed and a movable upper blade, a front plate member for covering front side of the upper blade, and driving gears for driving the upper blade.

In front of the shearing area, there is provided with a front plate member for covering the shearing area while defining a space through which sheet metal passes. At a lower portion of the front plate member, inversely U-shaped gates are provided for improvement of operational efficiency.

When a mechanic operates the shearing machine for cutting off a sheet, especially in a final step of the shearing operation thereof, to the required width, there may be a case, if the width is determined by a rear stopper, where the major portion of the remaining sheet will locate behind the front plate member while the minor portion thereof has to be held by the suitable presser. As the result, the mechanic will take risks of inserting his hands in the shearing area or placing his hands under the pressure in order to hold the sheet thereat.

For the safety of the operation, therefore, the conventional shearing operation has been obliged to be performed at a lower yield wherein the remaining sheets are substantially cast away before the operator will face the risk. The gate is covered by a net, or protected by a bar or wire stretched between both sides of the shearing machine, and in the former case the safety is improved but hands or any equipment to assist the operation will be unable to insert behind the front plate member wherein the sheet notwithstanding its efficient width will be cast away whereby economical efficiency will be reduced. And in the latter case, the operation will not be safely performed.

The main object of the present invention is to provide a safety device capable of eliminating all disadvantages as described above and increase working efficiency. For the said object a shearing machine according to the present invention is provided with a safety device comprising a bracket fixed to a front plate of the shearing machine, a plurality of safety guards mounted on said bracket so as to cover concave gates defined in said front plate, said safety guards being readily detachable, and flasher means indicating positions of the safety guards, thereby ensuring better safety during the operation.

The attached drawings illustrate, by way of example, a preferred embodiment according to the present invention wherein.

Figure 1:
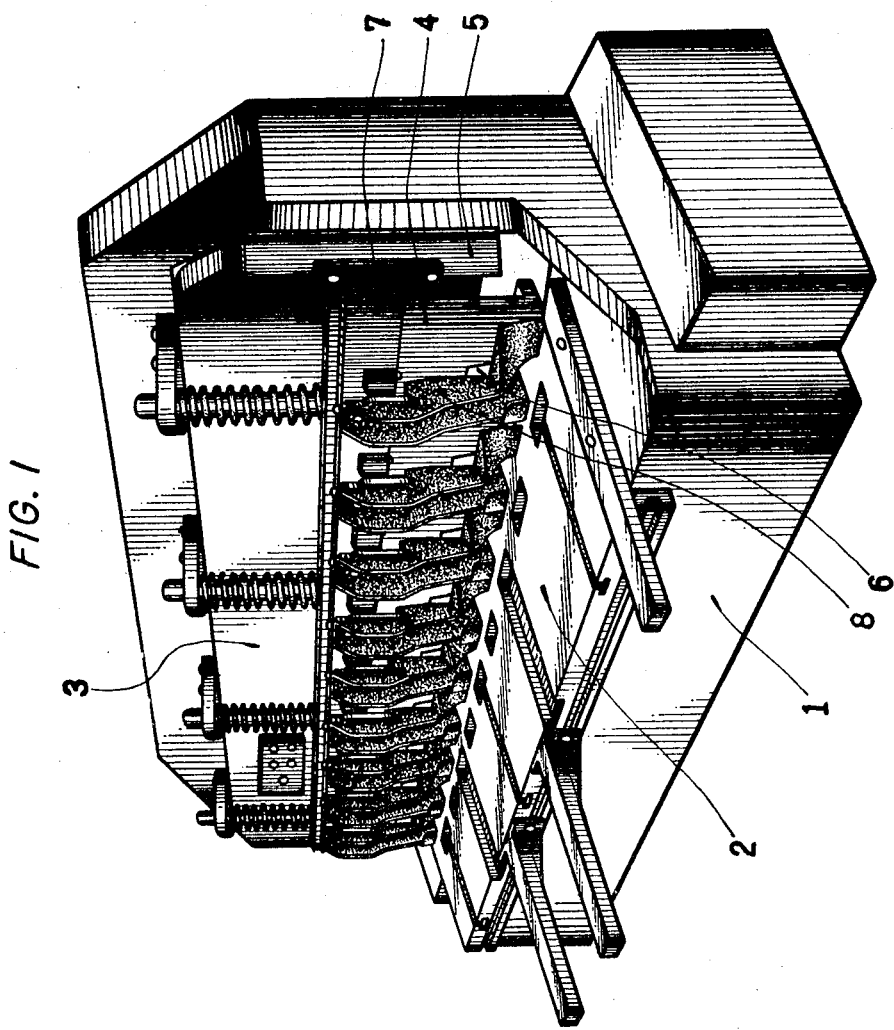
FIG. 1 is a perspective view of a shearing machine provided with a safety device according to the present invention.
Figure 2:
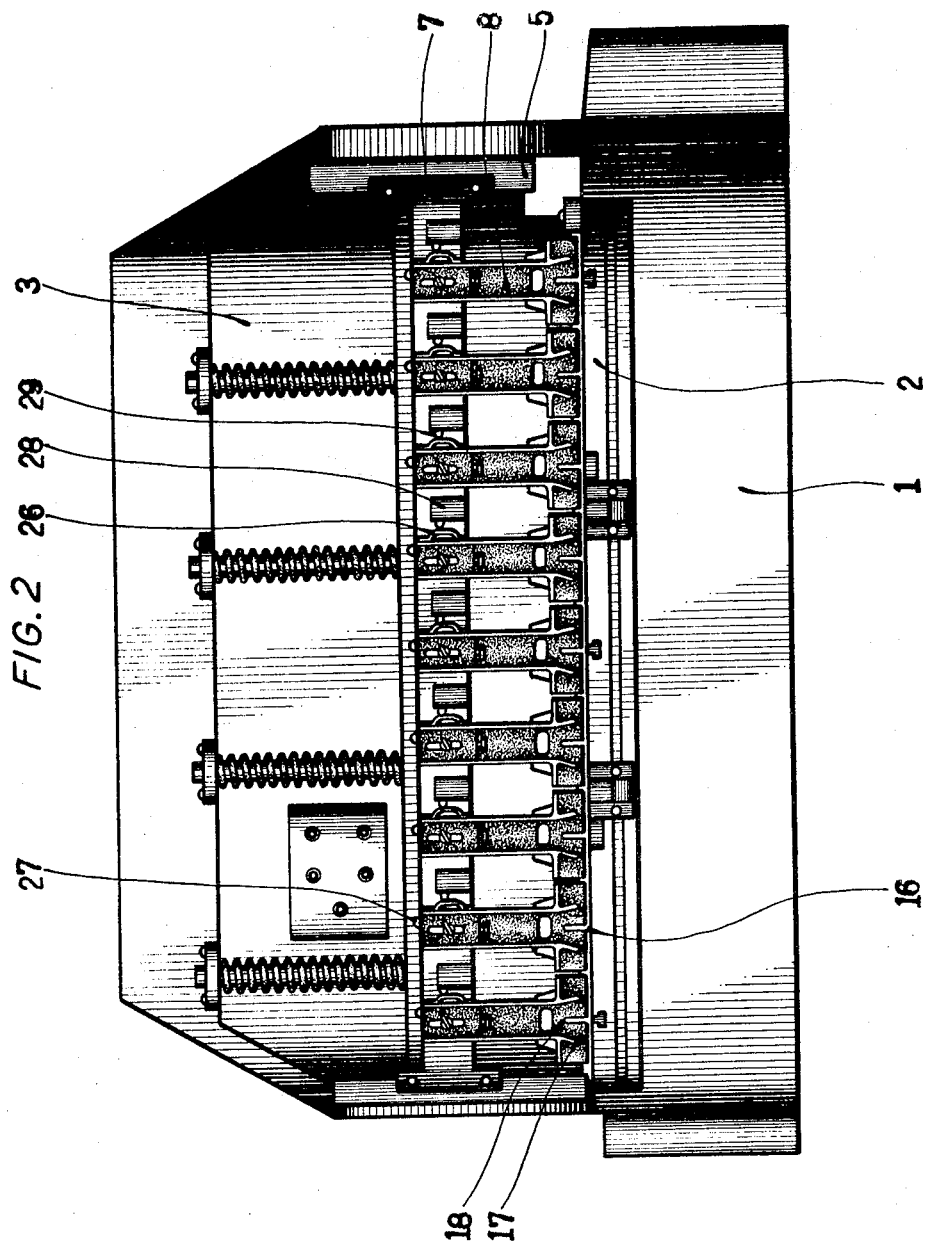
FIG. 2 is a front view of the shearing machine of FIG. 1.

In FIG. 1, the numeral 1 designates a bed of a shearing machine which is adapted to cut off a sheet linearly to each required width or length thereof.

The numeral 2 is a table on which the sheet is placed and pushed against a rear stopper (not shown) by a mechanic (operator). At the rear side of the table 2, a lower blade is fixed to the bed 1. The lower blade is to be brought into shearing engagement with an upper blade while defining a suitable clearance therebetween, said upper blade being supported by a vertically movable frame 3 at a lower portion thereof, and the sheet will be cut off.

A front plate member 4 is connected with a side frame 5 which is installed in the front of the frame 3 and extending from the bed. The front plate member 4 covers the shearing area.

A plurality of reverse U-shaped gates 6 are arranged, with regular intervals, at a lower portion of the front plate 4. A bracket 7 is fixed to the front plate 4 at an upper and front sides thereof.

Figure 3:
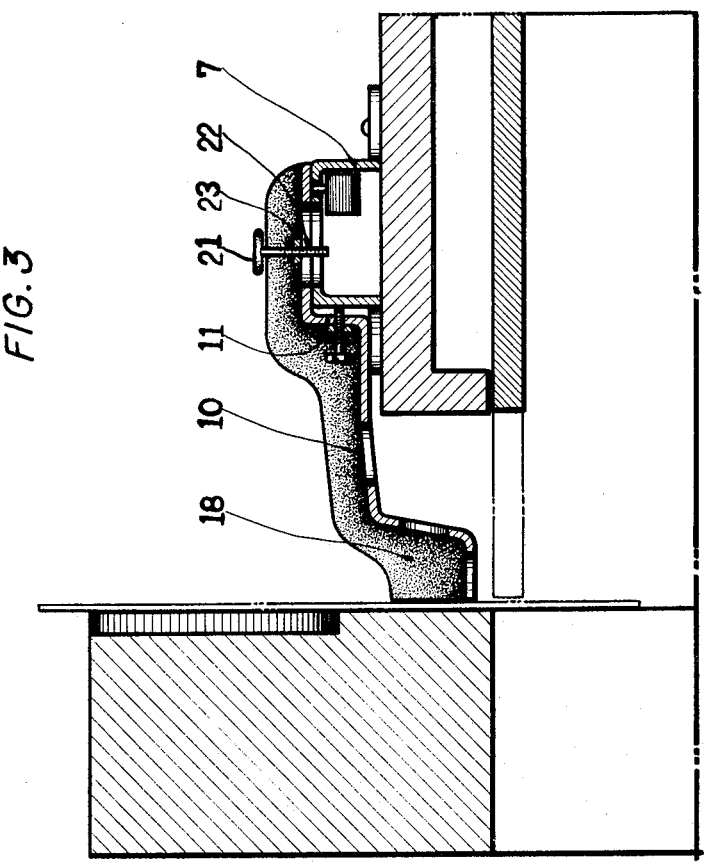
FIG. 3 is a side elevational section, diagrammatically illustrating a mounting condition, of a safety guard according to the present invention.

As shown in FIG. 3, mounted on the bracket 7 is a safety guide 8, according to the present invention, of which position is vertically adjustable in a determined range while covering the gate 6 of the front plate member.

Figure 4:
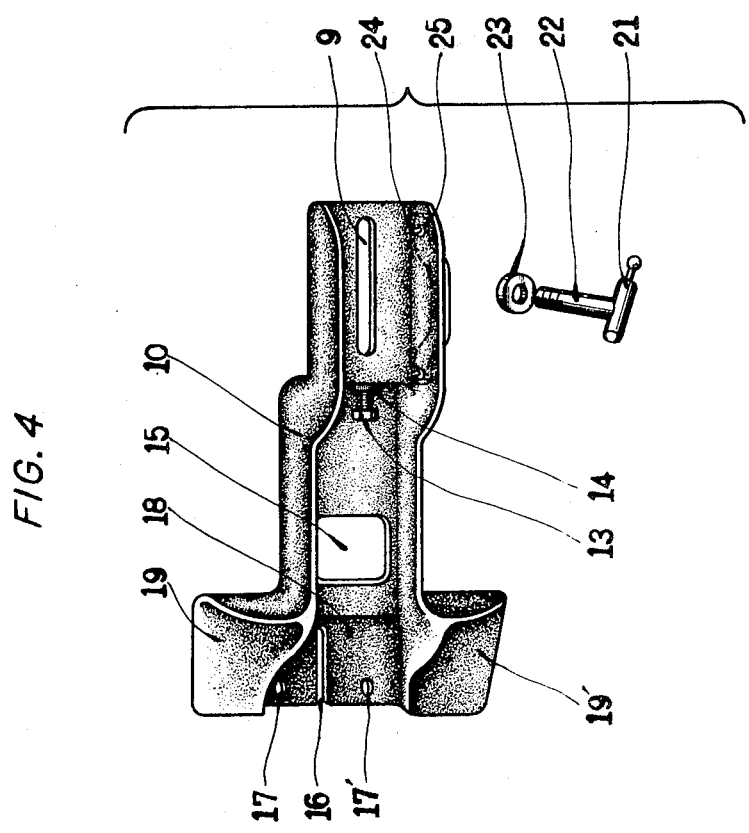
FIG. 4 is a perspective view of the safety guard according to the present invention.

In FIG. 4, provided on the safety guide 8 is an elongated hole 9 which is adapted to adjust the mounting height of the safety guard 8. A raised portion 10 is provided at a lower portion of the elongated hole 9. On the said raised portion 10 as shown in FIG. 3, an upper limit stopper 11 is arranged so as to permit the lower portion of the bracket 7 adjustably to be in contact therewith. Provided at the required position of the upper limit stopper 11 is a hole 12 through which a bolt 13 passes, the bolt 13 being fixed by double nuts 14, 14' thereby enabling the bolt 13 to contact with the lower surface of the bracket 7.

The mounting height of the safety guard 8 is to be determined by adjustment of the bolt 13 by means of a suitable racket or spanner.

As shown in FIG. 4, formed below the raised portion 10 of the safety guide 8 is a square hole 15 which is to serve as an observation opening from the upper position, while dimension of the hole being so designed that no operator can insert his hands through the hole 15.

A slit 16 is defined at a lower portion of the safety guard 8 and small sized holes 17 and 17' each is positioned on either side of the slit 16. The slit 16 has such a height and width that a bar being usable for withdrawal of remainders after cutting of the sheets can pass through the slit. These small holes 17 and 17' will be therefore used for observation from the lower position.

At a lower portion of the safety guard 8, there is provided a crooked portion 18 for covering the gate 6 of the front plate 4 while being received in the gate 6. The crooked portion 18 on both sides thereof is provided with integrally formed supporters 19 and 19' which fit to the lower edge of the front plate 4 for fixing the safety guard 8 thereto.

The safety guard is vertically mounted on and fixed to the bracket 7 by means of an adjustable bolt 22 which comprises a handle 21 on the one end thereof and a thread portion on the other end, said bolt 22 passing through a washer 23 and the elongated slot 9, and being screwed in an internal thread hole provided on the bracket 7 for fixing thereto. Connected with an upper side plate of the safety guard 8 is a position indicator with a form of a convex plate 26 which is fixed to said plate by means of a bolt 24 and nut 25. A rotatable roller 29 connected with a flasher switch 28 of a flasher lamp 27 is adapted to touch with or get free from the plate 26 in accordance with the mounting position of the safety guard 8.

When the roller 29 is in touch with the position indicator 26, the space defined between the table 2 and the lower edge of the safety guard 8 being normal for safe operation, the switch 28 will put out a light to the flasher lamp 27. The switch puts a light onto the flasher lamp 27 when the roller 29 and the plate 26 are separated from each other. The space between the table 2 and the lower edge of the safety guard is to be determined to the required width.

A motor (not shown) will be also shut off when the switch 28 of the flasher lamp 27 is open. The switch 28 will be also communicated with a buzzer system.

The space is determined normally to about 8m.m. for each safety guard 8. The safety guard is so formed that, in the condition as stated above, upper edges of the safety guard 8 and the bracket 7 are aligned in a surface thereof. The safety guard 8 will have a notch, cut on a visible surface thereof as a datum line, for notifying the mounting condition of the safety guard.

A plurality of the datum lines will be also provided, each being spaced about 11m.m. from each other.

Characteristics and features of the present invention are summarized as follows.

A. The safety guard 8 with the form as stated above is adjustably mounted on the bracket 7 while covering the gate 6 defined within the front plate member 4, whereby it is possible for any operator to be safely engaged in shearing work and there will be no risk of inserting the operator's hands into the gate 6.

B. The crooked portion 18 fit in the gate 6 of the front plate 4 is provided at the lower portion of the safety guard 8, whereby a sheet having such a narrow width that a rear edge of the sheet locates below the front plate 4 is safely held and cut off, and there will be the most minimum wasting materials.

C. Due to the slit 16 defined in the crooked portion 18, in case that no operator can substantially hold the sheet for taking it out, it will be possible to draw the sheet toward him by inserting a thin bar into the slit while the remainder of the plate can be readily removed.

D. Due to adjustable mounting of each independent safety guard 8 onto the bracket 7, the space defined between the lower surface of the safety guide and the sheet will be changeable in line with each thickness of the sheet. In case that insertion of the sheet into the space is restricted due to folded edge thereof, the substantially required space will be able to be provided only by adjusting the bolt 13 and the nut 14 consisted of a handle 22 and a stopper 11 for adjusting the mounting position of the safety guard.

E. In relation to the space between the table 2 and the lower edge of the safety guard 8, putting on and out a light to a flasher lamp 27 by means of a flasher switch 28 communicated with the position indicator 26 will be effective to draw the operator's attention. If the switch is connected with a driving motor, starting and shutting off of the motor will be effectuated by the switch and better safety of the operator will be ensured.

The safety guard as stated above is mounted on the shearing machine to which no presser is provided, and also in case that on the shearing machine presser is provided there will be no risk of pressing hands of the operator since he is also protected by the safety guard.

I claim:

1. A safety device for a shearing machine comprising a pair of upper and lower edged blades for cutting off sheet metal to a desired width, driving means adapted to vertically move the upper blade, a front plate mounted on the front of the upper blade and provided with gates for the observation of the blades, a bracket fixed to said front plate, safety guards mounted on said bracket and arranged to cover the gate for protecting the operator during the operation of the shearing machine, indicating lights on the bracket for indicating whether the position of each corresponding safety guard is normal or not, each indicating light being connected to a switch adapted to actuate the indicating light when the corresponding safety guard is out of normal position and to shut off the driving means for moving the upper blade in the vertical direction.

2. A safety device for a shearing machine comprising a pair of upper and lower edged blades for cutting off sheet metal to a desired width, driving means adapted to vertically move the upper blade, a front plate mounted on the front of the upper blade and provided with gates for the observation of the blades, a bracket fixed to said front plate, safety guards mounted on said bracket and arranged to cover the gate for protecting the operator during the operation of the shearing machine, each safety guard comprising a fitting portion for providing a fitting engagement with the gate of the front plate, a connecting portion extending from a crooked portion of the fitting portion and adapted to be in contact with the bracket, the safety guard being provided with a square-shaped observation opening between the fitting portion and the connecting portion and adapted for observation of the blades, supporters formed on both sides of the fitting portion to cover the width of each of said gates and to check the insertion of the operator's hands therein, the fitting portion being provided with a slit adapted to pass a bar.

3. The safety device of claim 2 in which the shearing machine includes a table and an indicating light, a space defined between the lower surface of the safety guard and the table adapted to permit sheet metal to pass therethrough, and means to actuate the indicating light when a safety guard is not in a preset predetermined position relative to the lower blade.

* * * * *